United States Patent [19]
Roberts

[11] Patent Number: 6,070,344
[45] Date of Patent: Jun. 6, 2000

[54] APPARATUS FOR EXCAVATING AND TRANSPLANTING TREES AND THE LIKE

[76] Inventor: John Vowell Roberts, 2800 Pleasant Valley, Brighton, Mich. 48116

[21] Appl. No.: 09/185,800

[22] Filed: Nov. 4, 1998

[51] Int. Cl.[7] .................................................. A01G 23/02
[52] U.S. Cl. .............................................. 37/302; 111/100
[58] Field of Search .................... 37/302, 301; 111/100, 111/101, 106, 114; 414/23

[56] References Cited

U.S. PATENT DOCUMENTS

| | | | |
|---|---|---|---|
| 2,792,948 | 5/1957 | DeShano | 414/23 |
| 3,989,075 | 11/1976 | Coughran, Jr. . | |
| 4,179,847 | 12/1979 | Osterwalder | 111/101 |
| 4,286,398 | 9/1981 | Lemond et al. | 111/101 |
| 4,351,253 | 9/1982 | Dahlquist . | |
| 4,403,427 | 9/1983 | Dahlquist . | |
| 4,625,662 | 12/1986 | Heinzen | 34/302 |
| 4,796,941 | 1/1989 | Reilly . | |
| 5,081,941 | 1/1992 | Weeks | 37/302 |
| 5,156,101 | 10/1992 | Wien | 111/101 |
| 5,465,770 | 11/1995 | Lansberry . | |
| 5,485,691 | 1/1996 | Stevens et al. | 37/302 |
| 5,496,143 | 3/1996 | Breyer | 414/23 |
| 5,600,904 | 2/1997 | Bowling | 37/302 |
| 5,715,614 | 2/1998 | Ookuwa et al. . | |

FOREIGN PATENT DOCUMENTS

| | | | |
|---|---|---|---|
| 002353828 | 4/1975 | Germany | 37/302 |

OTHER PUBLICATIONS

S.E. Clegg Nursery Equipment, Clegg "Spade Baller", Apr. 10, 1975.

Advertisement for 20"/24" Tree Load Transplanter (no date).

*Primary Examiner*—Thomas B. Will
*Assistant Examiner*—Kristine M. Markovich
*Attorney, Agent, or Firm*—Gifford, Krass, Groh, Sprinkle, Anderson & Citkowski, P.C.

[57] ABSTRACT

An apparatus for excavating and transplanting a tree having an elongate trunk and a plurality of roots extending downwardly into a ground location. The apparatus includes a wheeled frame supporting a chassis, an elongated trailer hitch portion extending from a first end of the chassis and a tree excavating portion extending from a second end of the chassis. First, second and third guide assemblies are arranged in triangular fashion around a periphery of the tree excavating portion and each receive a selected spade element. A hammer is provided and is engageable with the spade elements in successive fashion so as to drive the spade elements in inwardly and downwardly angled fashion within the selected ground location. The elongated trailer hitch portion is pivotally deflected in a downward fashion so as to exert an upward pivoting force upon the tree excavating portion and to forcibly remove the selected tree from the ground location.

18 Claims, 5 Drawing Sheets

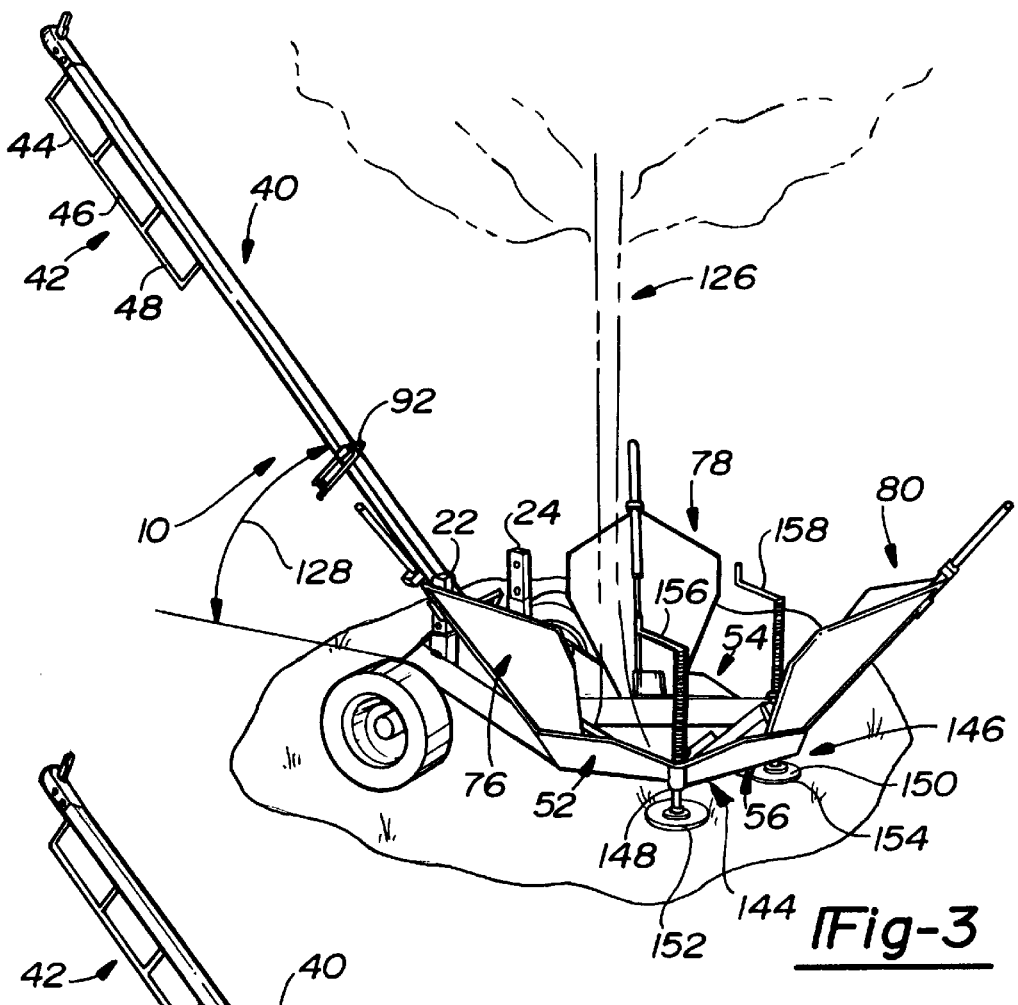
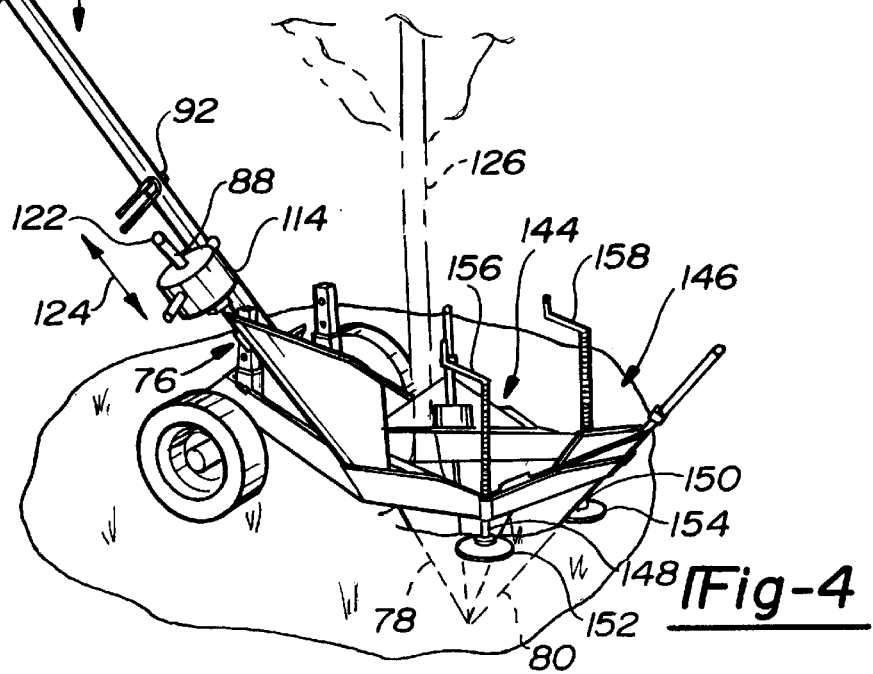

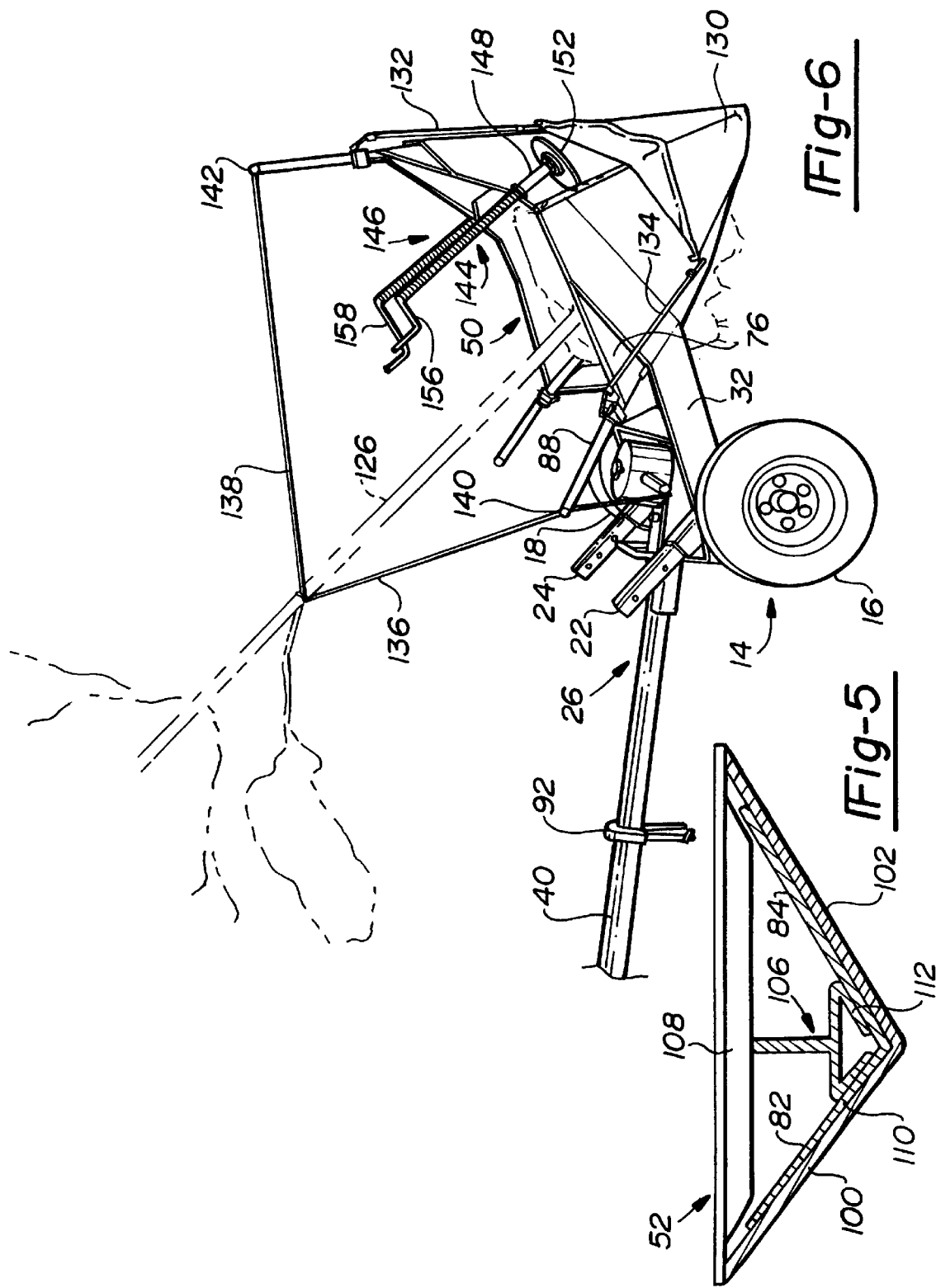

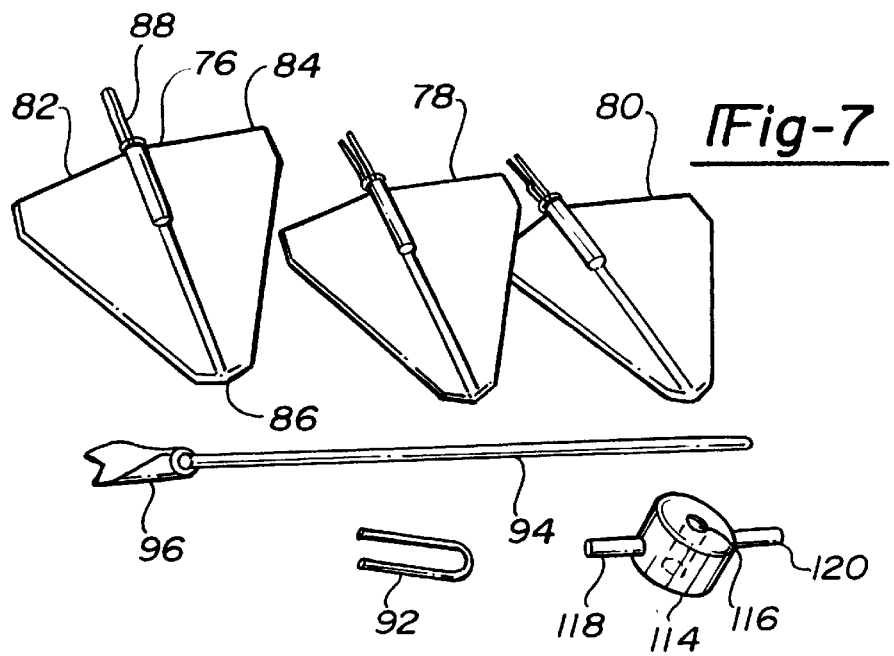
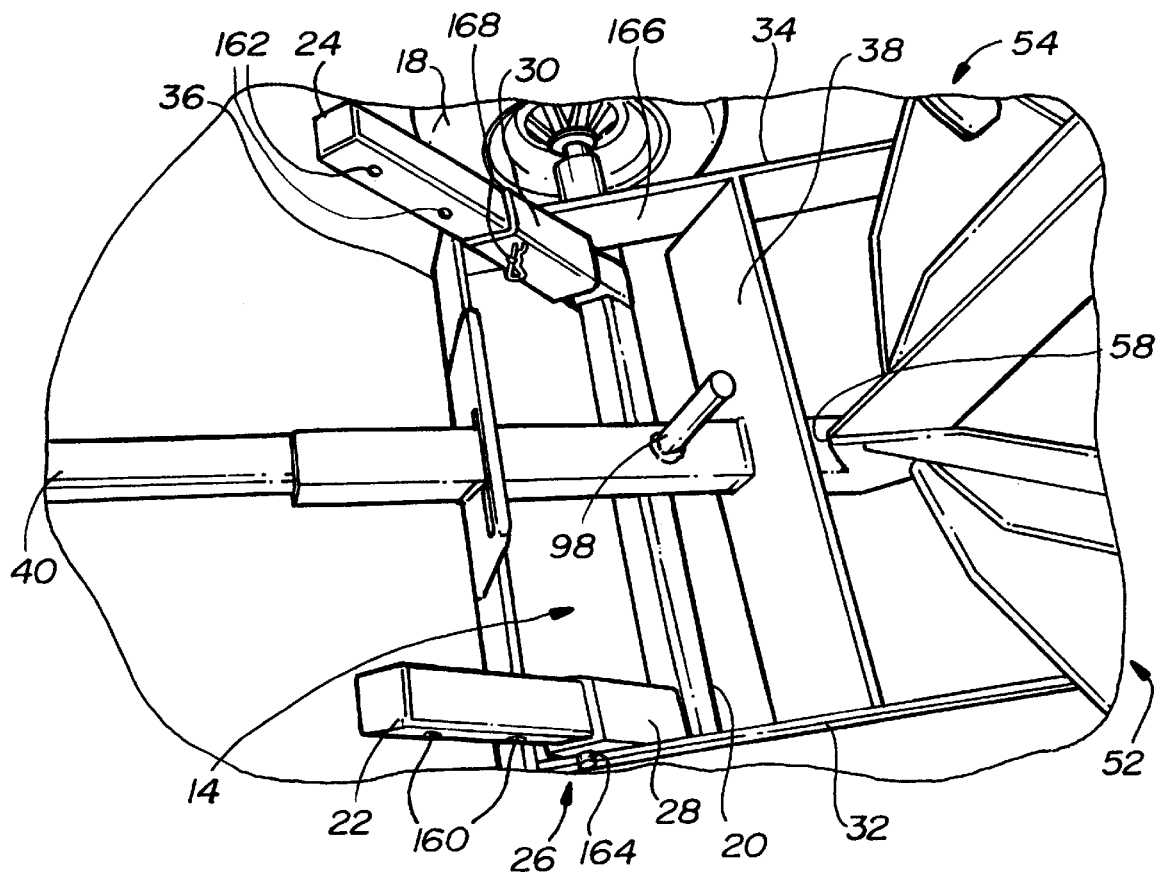

APPARATUS FOR EXCAVATING AND TRANSPLANTING TREES AND THE LIKE

BACKGROUND OF THE INVENTION

1. Field of the Invention

The present invention relates generally to tree removal and transplanting devices and, more particularly, to a simplified and improved apparatus for manually excavating and transplanting a tree and which is more easily adapted to adjust the amount of surrounding earth removed with a tree and roots and which permits the exertion of a greater degree of cantilever bending forces for causing forcible removal of the tree from a ground location.

2. Description of the Prior Art

Tree spade removal devices for excavating and, if desired, replanting certain sized trees, shrubs and other plant life are fairly well known in the art. The purpose of such devices is to provide a means for removing smaller sized trees from a desired area and replaces the necessity of having to manually dig around the roots of the tree and then forcibly remove the tree.

Large self-propelled tree planters and harvesters are illustrated in U.S. Pat. No. 4,625,662, issued to Heinzen and U.S. Pat. Nos. 4,351,253 and 4,403,427, both issued to Dahlquist. In each instance, the above devices are mounted upon a vehicle and include a significant hydraulically operated mechanism for forcibly gripping and removing a tree from a ground location. Along similar lines, a trailer supported and hydraulically operating tree transplanting apparatus is illustrated in U.S. Pat. No. 5,600,904, issued to Bowling.

Recent attempts have also been made at producing a smaller version of a tree removal/transplanting device which does not require heavy hydraulic or other powerized means for removing smaller sized trees. An example of such a device is illustrated in the Tree Toad Transplanter brochure which shows a three spaded bucket design secured to a vertically actuable hydraulic jack and capable of lifting rootballs weighing in excess of 500 pounds.

A further example of a trailerable and tree excavating apparatus is illustrated in U.S. Pat. No. 5,485,691, issued to Stevens et al., which shows a wheel supported device which includes an elongate trailer hitch portion, a body supporting a plurality of securably mounted spades, and a vertically extending support post structure which interconnects to the spades and includes a crank mechanism for upwardly actuating the spades enclosing the tree rootball out of the ground location.

SUMMARY OF THE PRESENT INVENTION

The present invention is an apparatus for excavating and transplanting a tree which is an improvement over previously known devices in that it provides enhanced lifting forces in a manually operable device. The apparatus includes a wheeled frame supporting a chassis, an elongated trailer hitch portion extending in an upwardly angled fashion from a first end of the chassis, and a tree excavating portion extending in a substantially planar fashion from a second end of the chassis. The tree excavating portion further includes first, second and third guide assemblies integrally formed with corresponding first, second and third sides of the excavating portion. A forward most located guide assembly corresponding with a front end of the tree excavating portion is capable of being removed for permitting the apparatus to be arrayed around the selected tree to be removed.

Three individual tree spade elements are capable of being supported upon the frame in a first stored portion and are further selectively engageable within the guide assemblies in a second use position. Each of the spade elements includes first and second angularly offset and planar faces which extend downwardly into a generally pointed end and which further include a shaft portion securing to and extending upwardly from the second end. A hammer is provided and is translatable in upward and downwardly fashion along the shaft portions so as to forcibly translate the spade elements into the ground location until lower pointed ends of the spade elements are arrayed in proximity to one another and upon the tree excavating portion being arranged in encircling fashion around a selected tree to be excavated.

The height of the chassis and tree excavating portion is capable of being varied relative to the surface of the ground location and this is accomplished by the provision of first and second pedestal supported and threaded jack screws mounted to extend through internally threaded vertically mounted tubes at forward locations of the tree excavating portion. Working in combination with the pedestal supported jack screws are telescoping outer tubular portions forming part of the chassis and securing to upwardly extending and elongate tubular members forming part of the wheel support axle and located proximate to the interconnection with the elongate hitch portion. By varying the height of the forwardly located jack screws and the rearwardly mounted and telescoping outer tubular portions in corresponding fashion, the height of the tree excavating portion (which is integrally formed with the apparatus chassis) can be selectively modified in relation to the surface of the ground location and thereby will modify the size and volume of the rootball which is removed from the ground location along with the tree.

The biasing force sufficient for removing the tree from the ground location is provided by the elongated trailer hitch portion which includes an elongate extension projecting from an underside of the hitch portion and including a plurality of hand hold sections. The elongated hitch portion affords the operator the ability to exert a greatly increased downward cantilever force, which acts about a pivot point defined by the wheeled frame, and creates an equal upward cantilever and lifting force to forcibly remove the selected tree from the ground location.

BRIEF DESCRIPTION OF THE DRAWINGS

Reference will now be made to the attached drawings, when read in combination with the following specification, wherein like reference numerals refer to like parts throughout the several views, and in which:

FIG. 3 is a first view illustrating the apparatus in place around a selected tree to be removed and with the spade elements installed within their respective guide assemblies according to the present invention;

FIG. 4 is a further view illustrating selected spade elements driven into the ground location and the manner in which the hammer is employed for downwardly actuating the spade elements;

FIG. 5 is a sectional view illustrating in cutaway the sliding interengagement established between a spade element and a selected guide assembly according to the present invention;

FIG. 6 is a view illustrating an excavated tree supported upon the apparatus and in a position to be secured to the vehicle hitch for transport;

FIG. 7 is a view of the spade elements, hammer, latch and support bar according to the present invention; and FIG. 8 is a further overhead view in section of the telescoping engagement of the outer tubular members forming a part of the chassis with the upwardly extending and elongate members forming a part of the wheel supported frame and operable in combination with the forwardly located and threaded jack screws for varying a height of the chassis and integrally formed tree excavating portion relative to the surface of the ground location.

DETAILED DESCRIPTION OF THE PREFERRED EMBODIMENTS

Figure 1:
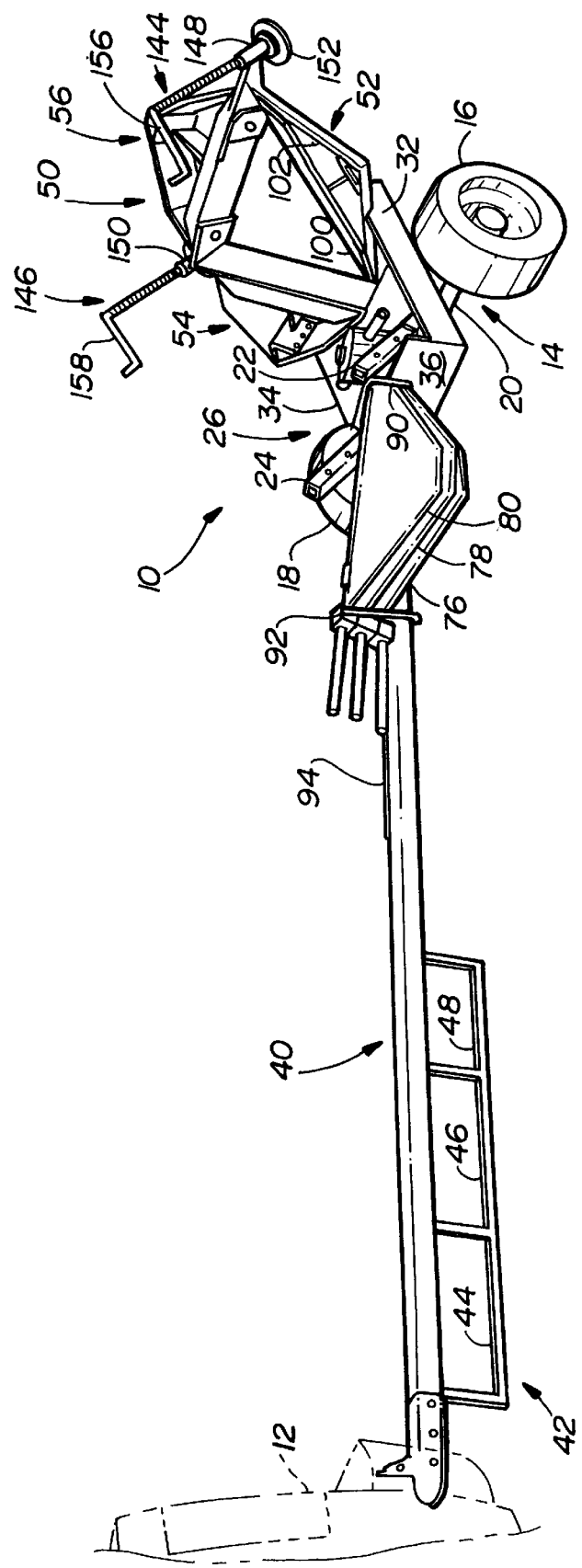
FIG. 1 is a perspective view illustrating the apparatus for excavating and transplanting a tree secured to a trailer hitch and according to the present invention.

Referring now to FIG. 1, an apparatus for excavating and transplanting a tree is shown at 10 and is capable of being secured to a conventional hitch portion of a vehicle 12. The apparatus 10 includes a wheeled frame 14 having a first wheel 16, a second wheel 18 and an axle 20 extending therebetween. The frame further includes a first upwardly extending and elongate tubular member 22 and a second upwardly extending and elongate tubular member 24, the tubular members 22 and 24 extending upwardly from the axle 20 and in proximity to each of the first and second wheels 16 and 18.

A chassis 26 is supported by the wheeled frame 14 and includes a first internally hollowed and outer tubular portion 28 which is telescopingly engaged around the first elongate tubular member 22 and a second internally hollowed and outer tubular portion 30 which is telescopingly engaged around the second elongate tubular member 24. As is best illustrated in FIG. 8, the chassis 26 further includes first and second elongate side members 32 and 34 to which the outer tubular portions 28 and 30 are fixedly secured as well as first and second cross members 36 and 38 which are located at generally forward and rearward locations of the chassis 26 and which establish a box-like structure for the chassis 26. Reference will again be made to the interengaging manner established between the chassis 26 and wheel supported frame 14 in the subsequent description of the height adjustment means.

Referring again to FIG. 1, an elongated trailer hitch portion 40 extends from a first end of the chassis 26 corresponding with the first cross member 36 and includes a grasping means in the form of an elongate extension 42 projecting from an underside of the hitch portion 40 and including a series of first 44, second 46 and third 48 handhold sections. A tree excavating portion 50 is provided at a second end of the chassis 26 and which is integrally formed with terminating ends of the elongate side members 32 and 34. A periphery of the tree excavating portion 50 includes an interconnected triangular shape defined by a first guide assembly 52, a second guide assembly 54 and a third guide assembly 56.

Figure 2:
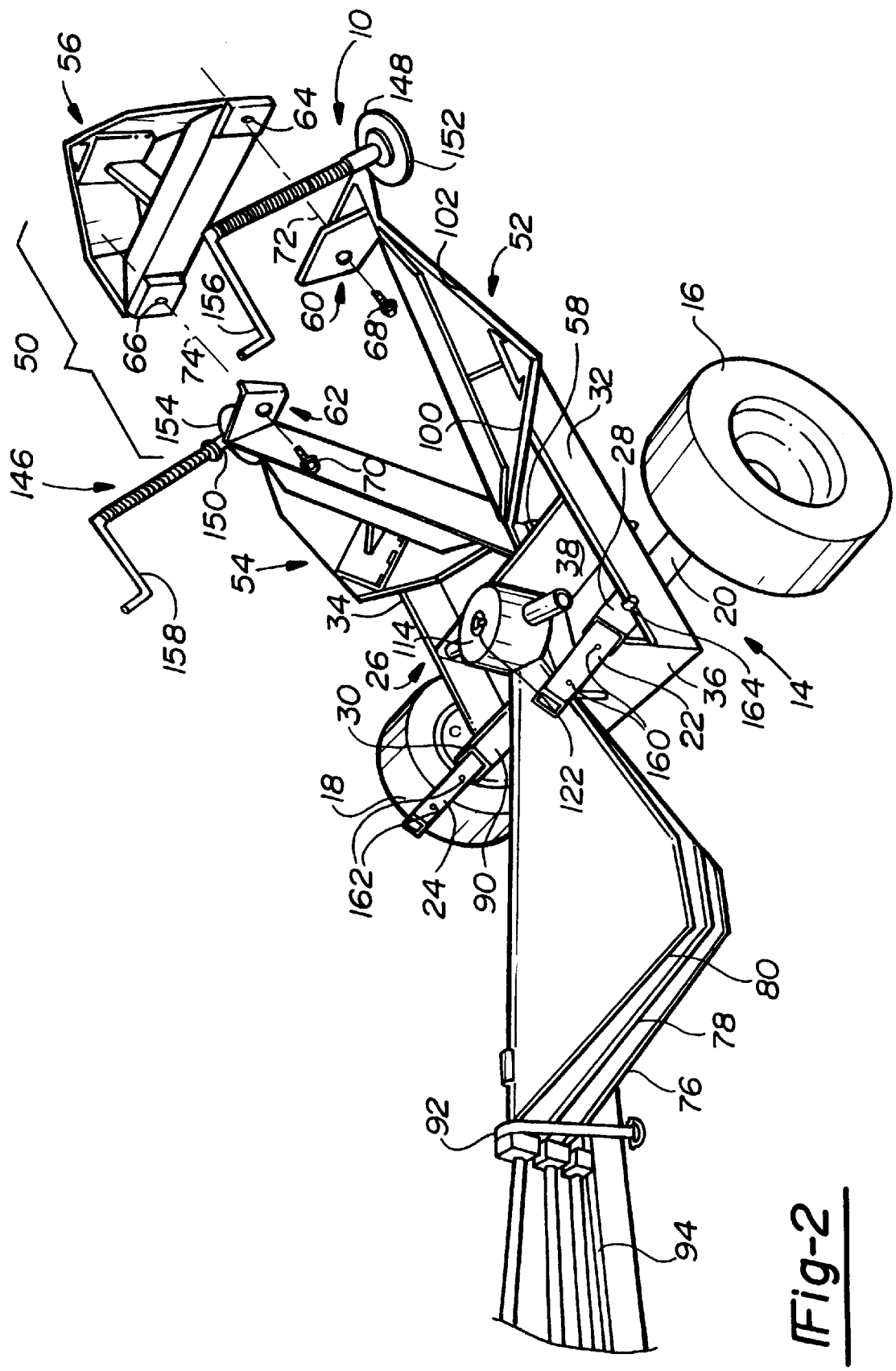
FIG. 2 is a view similar to that shown in FIG. 1 and further illustrating in exploded fashion the forward most located and removable guide assembly for permitting the tree excavating portion to be arrayed around the selected tree to be removed.

As is best shown in FIGS. 1, 2 and 8, the first guide assembly 52 is shown secured to the first elongate side member 32 and the second guide assembly 54 is shown secured to the second elongate side member 34. And interconnecting junction 58 of the first and second guide assemblies 52 and 54 is further illustrated secured to a most forward end of the elongated hitch portion 40. As is best illustrated in FIG. 2, the third guide assembly 56, which corresponds with a front end of the tree excavating portion 50, is capable of being removable from interconnecting ends 60 and 62 of the first and second guides assemblies 52 and 54, respectively. The third guide assembly 56 includes interiorly threaded and aligning apertures 64 and 66 formed at first and second locations along the guide assembly 56. Additional such apertures are provided through support brackets which consist of the interconnecting ends 60 and 62 and, upon the insertion of a pair of exteriorly threaded bolts 68 and 70 along directional lines 72 and 74, securably fasten the guide assembly 56 to the remainder of the tree excavating portion 50 upon the excavating portion 50 being arrayed around a desired tree to be removed.

A plurality of spade elements are provided for being selectively engaged within each of the guide assemblies 52, 54 and 56. Specifically, first 76, second 78 and third 80 spade elements are provided and, according to FIGS. 1 and 2, are illustrated in a first position supported upon the elongated trailer hitch portion 40. As is best illustrated from the view of FIG. 7, each of the spade elements includes a first planar face and a second planar face, a generally pointed end and a further end from which extends an elongated shaft portion. Specifically, first spade element 76 includes first planar face 82 and second planar face 84, generally pointed end 86 and elongate shaft portion 88 extending. As is again shown in FIG. 7, the second and third spade elements 78 and 80 are each identically constructed and include the corresponding features as illustrated.

As is again shown in FIGS. 1 and 2, the spade elements 76, 78 and 80 are shown supported on the elongate trailer hitch portion 40 by a generally U-shaped and upwardly extending support member 90 at a first forward location of the trailer hitch portion 40 for receiving the generally pointed tips and at a second intermediate location by a latch 92. Also illustrated is a support bar 94 which is sandwiched between the hitch portion 40 and the stacked spade elements 76, 78 and 80. The support bar 94 includes a flattened end 96 which is suitable for engaging a peg support 98 extending upwardly from the chassis 26 (see again FIG. 8).

As will now be described, the spade elements 76, 78 and 80 are capable of being removed from their stacked arrangement in the stored position and selectively engaged with the guide assemblies 52, 54 and 56 and so as to be actuated in a downward and inward fashion within the ground location surrounding the tree and rootball to be excavated. Referring to FIG. 5, an enlarged view is illustrated in section of a selected guide assembly, in particular guide assembly 52, which is suitable for receiving the first spade element 76. A first inwardly and downwardly angled face 100 is provided in an interconnecting and arrayed fashion relative to a second inwardly and downwardly angled face 102. The first and second faces 102 and 104 correspond with the first and second planar faces 82 and 84 of the first spade element 76 for receiving the spade element 76. A locating bracket 106 extends from a third face 108 interconnected at opposite ends by the first and second faces 102 and 104. The locating bracket 106 includes first and second angled end surfaces 110 and 112 extending parallel and spaced inwardly from the first and second angled faces 102 and 104 for engaging corresponding inside surfaces of the first and second planar faces 82 and 84 of the first spade element 76. Each of the second and third guide assemblies 54 and 56 are identically constructed and further explanation of their identically presented features need not be made.

A hammer 114 is provided for driving the spade elements 76, 78 and 80 into the ground location once they have been engaged with their associated guide assemblies. The hammer 114 includes a cylindrically shaped and weighted body with a central through hole 116 and handle portions 118 and 120 extending outwardly from the weighted body. As is shown in FIGS. 1 and 2, the hammer 114 is supported in a first stored position by inserting the weighted body (by through hole 116) upon the upwardly extending peg 98. Referring further to FIG. 4, the hammer 114 is removed from the peg 98, by removing a push pin 122, and the hammer 114 is then mounted by inserting through hole 116 over the extending shaft portion 88 of the first spade element 76. The push pin 122 is resecured through an aperture located at an upper most end of the shaft portion 88 and the hammer 114 is actuable in upward and downward fashion (illustrated by arrow 124) over a limited range to forcibly drive the spade element into the ground location.

Referring to FIG. 3, the apparatus 10 is illustrated in a position surrounding a selected tree 126 to be removed, this having been accomplished once the guide assembly 56 has been detached from the remainder of the tree excavating portion 50, the triangular shaped peripheral opening of the portion 50 arrayed surrounding the tree 126, and the third guide assembly 56 resecured via the bolts 68 and 70 through the aligning apertures in the guide locations 64 and 66 of third guide assembly 56 and in the angled support brackets 60 and 62 defining the corresponding ends of the first and second guide assemblies 52 and 54.

Referring to FIG. 4, the spade elements 78 and 80 are illustrated in phantom substantially driven into the ground location and the hammer 114 is shown in the process of driving the spade element 76 in a like fashion and so that the spade elements will all be arranged in proximity to one another such that the roots of the tree 126 will be substantially encapsulated within a rootball for subsequent excavation. At this point, the rootball of the tree 126 is ready to be excavated and this is accomplished by the user applying a significant cantilever force to the handhold portions defined at 42 at the remote end of the hitch portion 40 and which results in an upward cantilever force being applied via the pivot point of the wheeled axle 20 and consequently to the tree excavating portion 50. A significant advantage of the present invention is the ability to forcibly disengage the rootball of the tree through the application of a cantilever force and without the need for hydraulic or other mechanized input which serves only to increase the expense, weight and complexity of the tree excavation apparatus. As is best shown in FIG. 3, maximization of the cantilever force is evident from the upward angle of the elongate hitch portion 40 relative to a generally horizontal plane established by the chassis 26 and tree excavating portion 50, such angle being illustrated at 128.

The present apparatus 10 is further best suited for removed generally smaller sized trees and FIG. 6 illustrates an example of the tree 126 supported upon the apparatus 10 in appropriate position for towing. Specifically, a planar sheet of material 130, such as burlap or the like, is capable of being placed around the rootball of the tree 126 and is held in place by elongate and elastic cords 132 and 134 which secure at first ends to the selected edges of the burlap sheet 130 and at second ends to the elongate shaft portions extending from the spade elements (such as from shaft 88 of first spade element 76). Additional securing lines 136 and 138 are tied to the apertures formed in the upper ends of the spade elements, such as at 140 and 142, and extend to secure about a desired location of the trunk of the tree 128. In the instance of replanting tree 128, the spade elements may be conveniently removed from within their associated guide recesses upon the excavating portion being arrayed over a suitable location for redepositing the tree into the ground.

Additional means are provided for adjusting a height of the chassis 26 and tree excavating portion 50 relative to the ground location for the purpose of modifying the volume of the rootball of the selected tree to be removed, this being accomplished by spacing the travel of the inwardly and downwardly arrayed spade elements 76, 78 and 80 in a vertical direction relative to the ground. Specifically, referring to FIGS. 1–6, a first elongate and externally threaded jack screw 144 and a second elongate and externally threaded jack screw 146 are provided at first and second forward locations of the tree excavating portion 50 proximate to the front facing end. A first vertically extending tube 148 and a second vertically extending tube 150 are fixedly mounted at the forward locations to the tree excavating portion 50 (proximate the connection between the removable third guide assembly 56 and the interconnecting ends of the first and second guide assemblies 52 and 54 as best shown in FIG. 2). The tubes 148 and 150 are each internally threaded so as to be able to receive the externally threaded jack screws 144 and 146, respectively, and bearing supported pedestal supports 152 and 154 are secured to the bottom ends of the jack screws 144 and 146. Crank portions 156 and 158 are likewise integrally formed with the upper ends of the jack screws and are rotated in one of either two directions for rotatably translating the jack screws upwardly or downwardly relative to the fixedly mounted tubes 148 and 150 and so that the pedestal supports fixedly engage the ground surface.

Concurrent with the forward height adjustment of the threaded jack screws 144 and 146, the chassis 26 is further adjusted by the provision of spaced apart pluralities of apertures 160 and 162 which are formed along the first and second elongate tubular members 22 and 24, respectively. A further aperture 164 and 166 is formed through each of the internally hollowed tubular portions 28 and 30 and, upon aligning a selected aperture 160 and 162 of each of the tubular members 22 and 24 with the apertures 164 and 166 of the tubular portions 28 and 30, a pin (such as is shown at 168 in FIG. 8) is inserted to establish a rearward height of the chassis 26 relative to the wheel supported frame 14. In the preferred embodiment, the chassis 26 is capable of being adjusted to upwards of three or four varying height positions and, in combination with appropriate height adjustment of the threaded jack screws 144 and 146, provides the apparatus with a significant range of height adjustment for varying the volume of the rootball to be removed.

Having described my invention, it is evident that the present invention discloses a novel and unique apparatus for excavating and transplanting a tree which is both a simplification and improvement over prior art devices for permitting the manual removal of smaller to medium sized trees and which further does so without the need of hydraulic or other mechanized force inputs. Additional embodiments will become apparent to those skilled in the art to which it pertains without deviating from the scope of the appended claims.

I claim:

1. An apparatus for excavating and transplanting a tree having an elongate trunk and a plurality of roots extending downwardly into a ground location, said apparatus comprising:

a wheeled frame supporting a chassis, an elongated trailer hitch portion extending from a first end of said chassis, and a tree excavating portion extending from a second end of said chassis and integrally formed with terminating ends of first and second elongate side members forming a portion of said chassis;

a reception means located around a periphery of said tree excavating portion and capable of receiving a plurality of individual spade elements in an inwardly and downwardly angled fashion, each of said spade elements exhibiting at least one planar face exhibiting a first pointed end and a second end, a shaft portion securing to and extending upwardly from said second end;

height adjustment means for raising and lowering said chassis and said tree excavating portion relative to the ground location;

a hammer capable of being arrayed over each of said spade elements in successive fashion and translatable in upward and downward fashion so as to forcibly translate said spade elements in said inwardly and downwardly angled fashion into the ground location until said pointed ends are arrayed in proximity to one another and upon said periphery of said tree excavating portion being arranged in encircling fashion around a selected tree to be excavated; and grasping means located at a remote end of said elongated trailer hitch portion and, upon the application of a downward force, capable of deflecting said trailer hitch portion in a downward fashion and about a pivot point defined by said wheeled frame, an upward force being exerted upon said tree excavating portion to forcibly remove the selected tree from the ground location.

2. The apparatus for excavating and transplanting a tree as described in claim 1, said periphery of said tree excavating portion further comprising a triangular shape defined by first, second and third sides which are capable of receiving first, second and third spade elements.

3. The apparatus for excavating and transplanting a tree as described in claim 2, said spade elements each further comprising a first planar face and a second angularly offset planar face.

4. The apparatus for excavating and transplanting a tree as described in claim 3, said reception means further comprising first, second and third guide assemblies integrally formed with said first, second and third sides of said tree excavating portion.

5. The apparatus for excavating and transplanting a tree as described in claim 4, each of said guide assemblies further comprising a first inwardly and downwardly angled face and a second inwardly and downwardly angled face, said first and second faces corresponding with said first and second planar faces of a selected spade element for receiving said spade element, said guide assemblies each further including a locating bracket extending from a third face interconnected at opposite ends by said first and second faces, said locating bracket including first and second angled end surfaces extending parallel and spaced inwardly from said first and second angled faces for engaging inside surfaces of said first and second planar faces of said spade element.

6. The apparatus for excavating and transplanting a tree as described in claim 4, further comprising a selected one of said first, second and third guide assemblies defining a forward most located guide assembly corresponding with a front end of said tree excavating portion and capable of being removable from said tree excavating portion for permitting said apparatus to be arrayed around a selected tree.

7. The apparatus for excavating and transplanting a tree as described in claim 6, further including interiorly threaded and aligning apertures formed at first and second locations along both said forward most guide assembly and a pair of angled support brackets extending inwardly from ends of said remaining selected guide assemblies, a pair of exteriorly threaded bolts engaging though said aligning pairs of apertures.

8. The apparatus for excavating and transplanting a tree as described in claim 1, said hammer further comprising a weighted body with a central through hole and handle portions extending outwardly from said weighted body, said hammer capable of being mounted to said shaft portion of said selected spade element.

9. The apparatus for excavating and transplanting a tree as described in claim 8, further comprising a peg extending upwardly from said frame for securing said hammer in a storing position, an aperture being formed horizontally through an upper end of said peg and receiving a pin for securing said hammer.

10. The apparatus for excavating and transplanting a tree as described in claim 1, said elongated trailer hitch portion extending in an upwardly angled fashion relative to a horizontal plane defined by said tree excavating portion.

11. The apparatus for excavating and transplanting a tree as described in claim 1, said height adjustment means further comprising:

first and second vertically mounted tubes extending from first and second forward locations of said tree excavating portion, said tubes each including an interiorly threaded and axially extending interior channel;

first and second elongate and externally threaded jack screws rotatably securing in extending fashion through said mounted tubes, said jack screws each further including integrally formed crank elements at first upper ends and freely rotatable and bearing supported pedestal supports at second lower ends;

said frame including an axle extending between first and second wheels, a first elongate tubular member extending upwardly from said axle proximate said first wheel and a second elongate tubular member extending upwardly from said axle proximate said second wheel, said first and second elongate tubular members each further including spaced apart pluralities of apertures formed therethrough;

said chassis further including first and second internally hollowed outer tubular portions seatingly engaging in telescoping fashion around said first and second elongate tubular members, said tubular portions each further including a further aperture formed therethrough, selected apertures from each of said tubular members aligning with a further aperture formed through said associated internally hollowed outer tubular portions for selectively elevating and lowering said chassis relative to the ground location; and first and second pins insertably engaging through said aligning apertures between said elongate tubular members and said telescopingly engaging outer tubular portions for establishing a selected height of said apparatus above the ground location concurrent with said first and second jack screws being rotatably and translateable engaged through said vertically mounted tubes to achieve an approximate and level height at said forward locations.

12. The apparatus for excavating and transplanting a tree as described in claim 1, said grasping means located upon said trailer hitch portion further comprising an elongate extension projecting from an underside of said hitch portion and including a series of first, second and third hand hold sections.

13. The apparatus for excavating and transplanting a tree as described in claim 1, further comprising a planar sheet of burlap capable of placing around said spade elements upon the selected tree and roots becoming forcible removed from the ground location, a plurality of elongate and elastic cords securing at first ends to selected edges of said burlap sheet and at second ends securing to said upwardly extending shaft portions.

14. An apparatus for excavating and transplanting a tree having an elongate trunk and a plurality of roots extending downwardly into a ground location, said apparatus comprising:

a wheeled frame supporting a chassis, an elongated trailer hitch portion extending from a first end of said chassis, and a tree excavating portion extending from a second end of said chassis;

a reception means located around a periphery of said tree excavating portion and capable of receiving a plurality of individual spade elements in an inwardly and downwardly angled fashion, said periphery of said tree excavating portion further including a triangular shape defined by first, second and third sides;

first, second and third guide assemblies integrally formed with said first, second and third sides of said tree excavating portion which are capable of receiving first, second and third spade elements, each of said spade elements exhibiting a first planar face and a second angularly offset and planar face and further exhibiting a first pointed end and a second end, a shaft portion securing to and extending upwardly from said second end;

each of said guide assemblies further including a first inwardly and downwardly angled face and a second inwardly and downwardly angled face, said first and second faces corresponding with said first and second planar faces of a selected spade element for receiving said spade element, said guide assemblies each further including a locating bracket extending from a third face interconnected at opposite ends by said first and second faces, said locating bracket including first and second angled end surfaces extending parallel and spaced inwardly from said first and second angled faces for engaging inside surfaces of said first and second planar faces of said spade element;

height adjustment means for raising and lowering said chassis and said tree excavating portion relative to the ground location;

a hammer capable of being arrayed over each of said spade elements in successive fashion and translatable in upward and downward fashion so as to forcibly translate said spade elements in said inwardly and downwardly angled fashion into the ground location until said pointed ends are arrayed in proximity to one another and upon said periphery of said tree excavating portion being arranged in encircling fashion around a selected tree to be excavated; and grasping means located at a remote end of said elongated trailer hitch portion and, upon the application of a downward force, capable of deflecting said trailer hitch portion in a downward fashion and about a pivot point defined by said wheeled frame, an upward force being exerted upon said tree excavating portion to forcibly remove the selected tree from the ground location.

15. The apparatus for excavating and transplanting a tree as described in claim 14, said spade elements further capable of being slidably disengaged from said guide assemblies.

16. The apparatus for excavating and transplanting a tree as described in claim 15, further comprising a support member arranged at a first location along said elongated hitch portion for restraining said pointed ends of said spade elements, a latch provided at an intermediate location of said hitch portion and receiving in inserting fashion said extending shaft portions for securing said spade elements in a stacked arrangement upon said hitch portion.

17. The apparatus for excavating and transplanting a tree as described in claim 16, further comprising a support bar mounted upon said elongated hitch portion and sandwiched between said hitch portion and said plurality of stacked spade elements.

18. An apparatus for excavating and transplanting a tree having an elongate trunk and a plurality of roots extending downwardly into a ground location, said apparatus comprising:

a wheeled frame supporting a chassis, an elongated trailer hitch portion extending from a first end of said chassis, and a tree excavating portion extending from a second end of said chassis;

a reception means located around a periphery of said tree excavating portion and capable of receiving a plurality of individual spade elements in an inwardly and downwardly angled fashion, each of said spade elements exhibiting at least one planar face exhibiting a first pointed end and a second end, a shaft portion securing to and extending upwardly from said second end;

height adjustment means for raising and lowering said chassis and said tree excavating portion relative to the ground location;

a hammer capable of being arrayed over each of said spade elements in successive fashion and translatable in upward and downward fashion so as to forcibly translate said spade elements in said inwardly and downwardly angled fashion into the ground location until said pointed ends are arrayed in proximity to one another and upon said periphery of said tree excavating portion being arranged in encircling fashion around a selected tree to be excavated; and grasping means located at a remote end of said elongated trailer hitch portion, said grasping means including an elongate extension projecting from an underside of said hitch portion and including a series of first, second and third hand hold sections and, upon the application of a downward force, being capable of deflecting said trailer hitch portion in a downward fashion and about a pivot point defined by said wheeled frame, an upward force being exerted upon said tree excavating portion to forcibly remove the selected tree from the ground location.

* * * * *

UNITED STATES PATENT AND TRADEMARK OFFICE
CERTIFICATE OF CORRECTION

PATENT NO. : 6,070,344
DATED : June 6, 2000
INVENTOR(S) : John Vowell Roberts

It is certified that error appears in the above-identified patent and that said Letters Patent is hereby corrected as shown below:

Column 3,
Line 31, after "28" insert -- as best seen in Fig. 2 --.
Line 33, after "30" insert -- as best shown in Fig. 2 --.

Column 4,
Line 50, replace "102" and "104" with -- 100 and 102 --.
Line 54, replace "102" and "104" with -- 100 and 102 --.
Line 57, replace "102" and "104" with -- 100 and 102 --.
Line 66, after "114" insert -- Show in Fig. 7, --.

Column 8,
Line 54, after "rotatably" insert -- engaged --.
Line 67, replace "forcible" with -- forcibly --.

Signed and Sealed this

Eighteenth Day of September, 2001

Attest:

NICHOLAS P. GODICI
Attesting Officer
*Acting Director of the United States Patent and Trademark Office*